United States Patent
Yamashina (10) Patent No.: US 7,804,444 B2
(45) Date of Patent: Sep. 28, 2010

(54) IN-VEHICLE RADAR SYSTEM

(75) Inventor: Noriyoshi Yamashina, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 12/030,599

(22) Filed: Feb. 13, 2008

(65) Prior Publication Data

US 2008/0258961 A1 Oct. 23, 2008

(30) Foreign Application Priority Data

Apr. 23, 2007 (JP) ............................. 2007-113146

(51) Int. Cl.
*G01S 13/00* (2006.01)
(52) U.S. Cl. ............................. 342/70; 342/89; 342/91
(58) Field of Classification Search ............. 342/70–72, 342/82, 89, 91, 92, 94, 118
See application file for complete search history.

(56) References Cited

U.S. PATENT DOCUMENTS

| | | | | |
|---|---|---|---|---|
| 4,807,101 A * | 2/1989 | Milde, Jr. ..................... | 362/276 |
| 5,266,955 A * | 11/1993 | Izumi et al. .................... | 342/70 |
| 5,495,251 A * | 2/1996 | Gilling et al. ................. | 342/70 |
| 5,572,484 A * | 11/1996 | Gaus et al. ..................... | 367/99 |
| 5,670,962 A * | 9/1997 | Henderson et al. ............ | 342/70 |
| 5,748,141 A * | 5/1998 | Hoess ......................... | 342/109 |
| 5,861,836 A * | 1/1999 | Hoss ........................... | 342/70 |
| 6,040,795 A * | 3/2000 | Watanabe ..................... | 342/70 |
| 6,055,042 A * | 4/2000 | Sarangapani ............... | 356/4.01 |
| 6,067,038 A * | 5/2000 | Uehara et al. ................. | 342/70 |
| 6,087,975 A * | 7/2000 | Sugimoto et al. ............. | 342/70 |
| 6,147,637 A * | 11/2000 | Morikawa et al. ............. | 342/70 |
| 6,583,753 B1 * | 6/2003 | Reed ........................... | 342/70 |
| 6,617,999 B2 * | 9/2003 | Kondo et al. .................. | 342/70 |
| 6,825,756 B2 * | 11/2004 | Bai et al. ..................... | 340/435 |
| 6,907,329 B2 * | 6/2005 | Junger et al. .................. | 701/36 |
| 7,109,915 B2 * | 9/2006 | Kurodai et al. ................ | 342/82 |
| 7,136,013 B2 * | 11/2006 | Hanawa et al. ................ | 342/70 |
| 7,321,818 B2 * | 1/2008 | Michi et al. ................... | 701/96 |
| 7,345,620 B2 * | 3/2008 | Voigtlaender et al. ......... | 342/82 |
| 7,518,545 B2 * | 4/2009 | Minichshofer ............... | 342/70 |
| 2005/0055150 A1 * | 3/2005 | Uhler et al. ................... | 701/93 |

(Continued)

FOREIGN PATENT DOCUMENTS

JP 06-059032 A 3/1994

(Continued)

*Primary Examiner*—Thomas H Tarcza
*Assistant Examiner*—Peter M Bythrow
(74) *Attorney, Agent, or Firm*—Sughrue Mion, PLLC (57) ABSTRACT

An in-vehicle radar system, which transmits an electric wave toward a target object and measures the distance between a subject vehicle and the target object, based on the electric wave that has been reflected by the target object and is received by the in-vehicle radar system, includes subject vehicle-speed determination means for determining whether or not the subject vehicle is in a halt state or moving at a predetermined speed or lower; transmission-output control means for setting transmission output smaller than that for the case where the subject vehicle is moving, when the subject vehicle-speed determination means detects that the subject vehicle is in a halt state or moving at the predetermined speed or lower; and reception-sensitivity control means for setting a reception gain amount larger than that for the case where the subject vehicle is moving.

20 Claims, 7 Drawing Sheets

U.S. PATENT DOCUMENTS

2008/0258961 A1 * 10/2008 Yamashina .................. 342/91

FOREIGN PATENT DOCUMENTS

| | | | |
|---|---|---|---|
| JP | 07-020234 A | 1/1995 |
| JP | 7-234282 A | 9/1995 |
| JP | 2000-314774 A | 11/2000 |
| JP | 2006-21578 A | 1/2006 |

* cited by examiner

[ IN THE CASE WHERE TRANSMISSION ELECTRIC POWER IS REDUCED ]

(a)

[ IN THE CASE WHERE RECEPTION GAIN IS ADJUSTED ]

IN-VEHICLE RADAR SYSTEM

BACKGROUND OF THE INVENTION

1. Field of the Invention

The present invention relates to an in-vehicle radar system for transmitting an electric wave toward a target object and measuring the distance between the subject vehicle and the target object and the like, based on the electric wave that has been reflected by the target object and received by the in-vehicle radar system.

2. Description of the Related Art

To date, an in-vehicle radar system has been known in which, based on the time between a time instant when an electric wave has been transmitted (irradiated) forward from the subject vehicle and the time instant when the electric wave that has been reflected by a target object (e.g., a preceding vehicle) existing in front of the subject vehicle is detected, the distance between the subject vehicle and the target object and the like are calculated. It is required that such an in-vehicle radar system as described above has a function in which an electric wave is transmitted when the subject vehicle is in a moving state and, in contrast, when the subject vehicle is in a halt state, the transmission output power is reduced or the transmission is halted so that electric power is saved. As the in-vehicle radar system having a function in which, as described above, the transmission of an electric wave is halted when a vehicle is in a halt state, for example, an in-vehicle radar system, which is set forth in Patent Document 1, is known.

[Patent Document 1] Japanese Patent Application Laid-Open No. 2006-21578

However, in a conventional in-vehicle radar system disclosed in Patent Document 1, the transmission of an electric wave is halted without any condition when the vehicle is in a halt state; therefore, it has been a problem that, even if the transmission is resumed at an appropriate timing, the state of a target object cannot be recognized and detected in a rapid and accurate manner.

SUMMARY OF THE INVENTION

The present invention has been implemented in order to solve the foregoing problem and is to obtain an in-vehicle radar system in which, even in the case where, when the subject vehicle is in a halt state, the transmission electric power is restricted to a predetermined output, a target object is not missed but can stably be detected even when the subject vehicle is in the halt state. Moreover, an in-vehicle radar system is obtained in which the transmission output is halted, as may be necessary, so as to avoid transmission of an unnecessary electric wave, thereby making it possible to save electric power.

According to the present invention, an in-vehicle radar system for transmitting an electric wave toward a target object, receiving the electric wave that has been reflected by the target object, and based on the received electric wave, calculating the distance between the subject vehicle and the target object and the like is configured in such a way that the reception sensitivity is changed when the transmission output is reduced in the case where the subject vehicle is in a halt state or moving at a predetermined speed or lower.

According to an in-vehicle radar system of the present invention, in the case where the subject vehicle is in a halt state or moving at a predetermined speed or lower, gain adjustment for the transmission and the reception is performed and the level of a reception signal is made higher than that of a threshold value; therefore, even in the case where the subject vehicle is in a halt state and the transmission electric power is reduced, a target object is not missed but can stably be detected.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
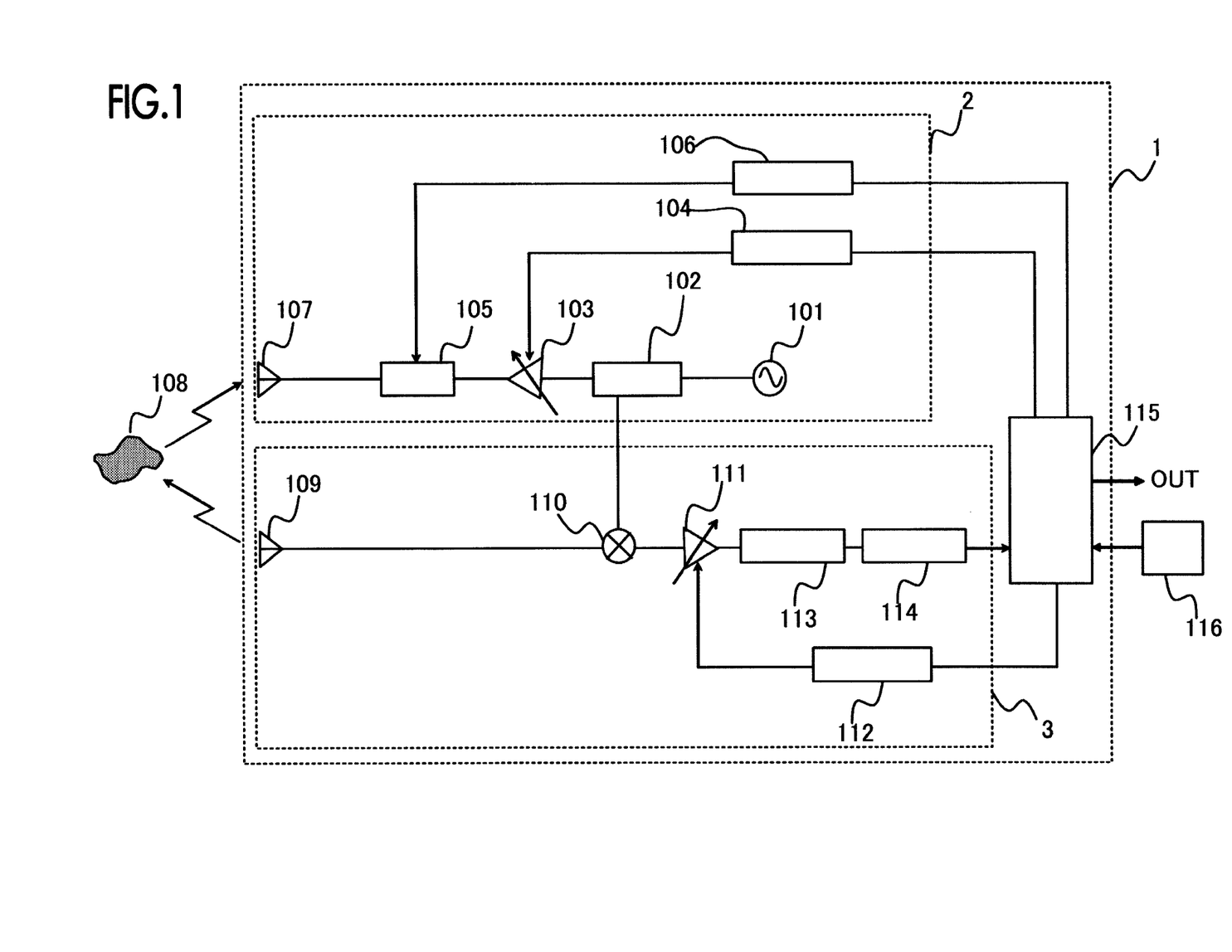
FIG. 1 is a diagram illustrating a configuration according to Embodiment 1 of the present invention.

Embodiment 1 of the present invention will be explained below. FIG. 1 is an overall block diagram for an in-vehicle radar system according to Embodiment 1 of the present invention. An in-vehicle radar system 1, which is a radar system that operates in accordance with a pulse method, illustrated in FIG. 1 is configured mainly with a transmission unit 2, a reception unit 3, and a CPU 115. In the transmission unit 2, after being generated by an oscillator 101, a transmission signal is distributed by a distributor 102 to a variable-gain transmission amplifier 103 and a mixer 110. The gain amount of the variable-gain transmission amplifier 103 is controlled a variable-gain transmission amplifier control unit 104 and the electric power (the transmission signal) that has been distributed by the distributor 102 is amplified.

Figure 2:
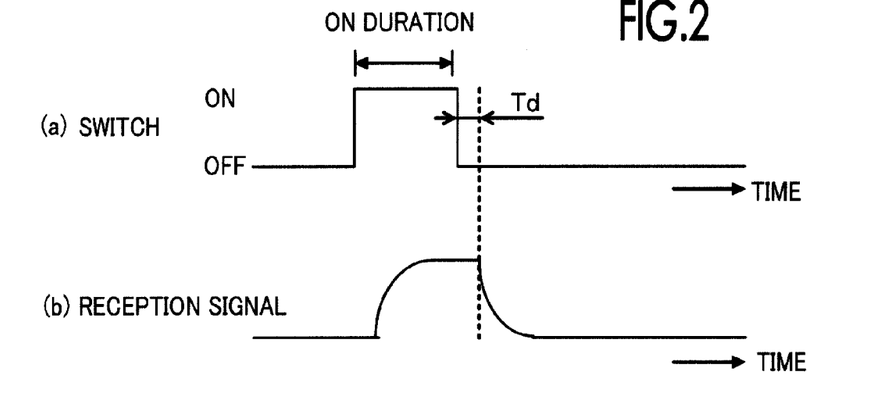
FIG. 2 is a set of charts representing the respective statuses of a transmission pulse and a reception signal according to Embodiment 1.

In a switch 105, the amplified transmission signal is controlled by a switch control unit 106, divided, as represented in FIG. 2(a), per predetermined ON duration so as to become a pulse wave, and as an electric wave, emitted by a transmission antenna 107 into space. The block ranging from the oscillator 101 to the transmission antenna 107 is referred to as the transmission block 2. After that, the electric wave that has been reflected by a target object 108 existing in front of the subject vehicle is received by the reception block 3. In the reception block 3, firstly, the electric wave that has been reflected by the target object 108 is received by a reception antenna 109 and as reception signal, inputted to the mixer 110. In the mixer 110, the reception signal is mixed with the transmission signal distributed by the distributor 102 described above. After that, a variable-gain reception amplifier control unit 112 controls the gain amount of the variable-gain reception amplifier 111 that amplifies the reception signal that has been mixed by the mixer 110.

The amplified reception signal is inputted to a lowpass filter 113; the lowpass filter 113 outputs an output waveform whose rising timing is delayed, as represented in FIG. 2(*b*). Next, the output waveform is converted by an A/D converter 114 into a digital signal and inputted to the CPU 115. In the CPU 115, based on a delay time Td that is, as represented in FIG. 2, a time from the timing when a pulse-like electric wave is transmitted to the timing when the pulse-like electric wave reflected by a target object is received, distance information R is calculated by use of the equation R=c·Td/2 ("c" denotes the light velocity). Additionally, the CPU 115 determines whether or not a target object exists. The block ranging from the reception antenna 109 to the A/D converter 114 is referred to as a reception block. In addition, a vehicle speed sensor 116, which is connected to the CPU 115, detects a vehicle-speed pulse signal corresponding to the vehicle speed of the subject vehicle equipped with the in-vehicle radar system, and outputs the detected vehicle-speed pulse signal to the CPU 115. After receiving the vehicle-speed pulse signal, the CPU 115 controls the variable-gain transmission amplifier control unit 104, the switch control unit 106, and the variable-gain reception amplifier control unit 112.

Figure 3:
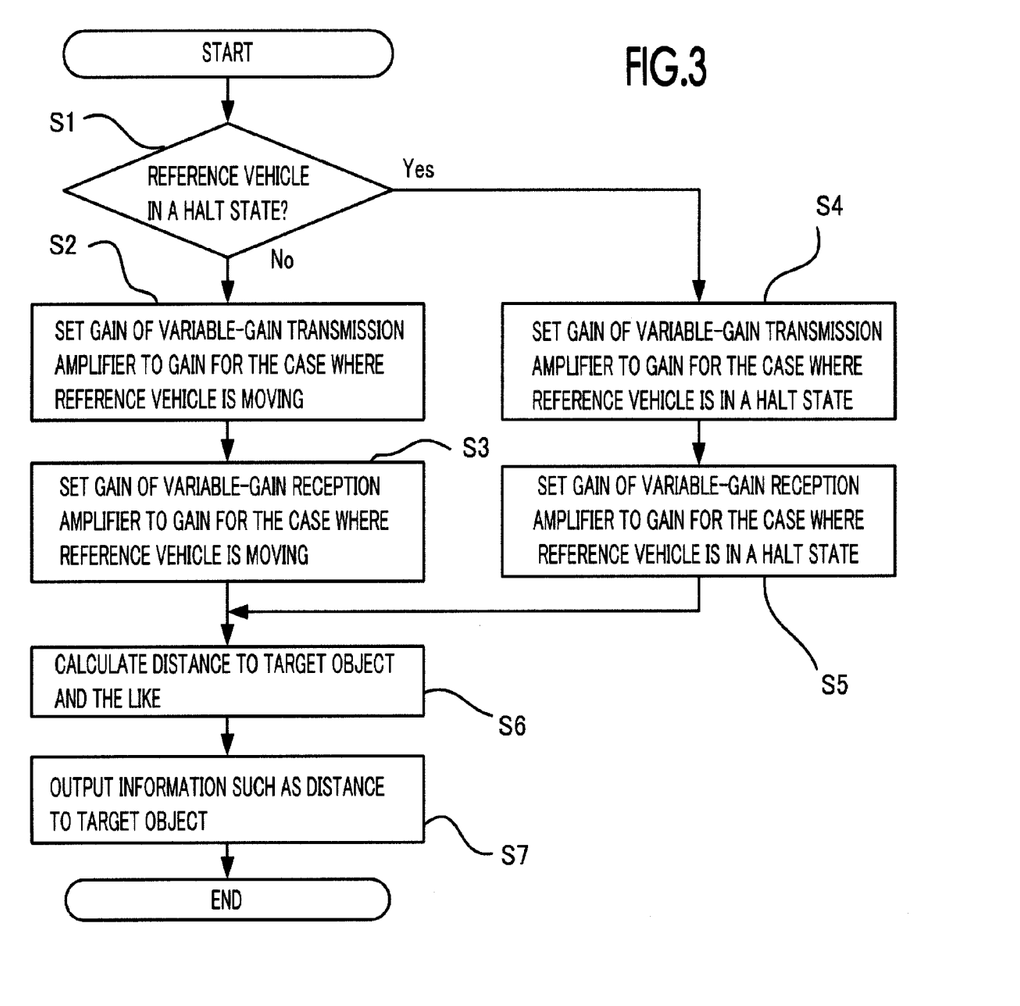
FIG. 3 is a flowchart illustrating operation according to Embodiment 1.

Next, the operation of the in-vehicle radar system 1 in Embodiment 1 will be explained with reference to the flowchart in FIG. 3. The explanation will be started with a description for the situation in which the vehicle speed sensor 116 in FIG. 1 outputs to the CPU 115 a vehicle-speed pulse signal corresponding to the speed of the subject vehicle. In Step S1 in FIG. 3, based on the vehicle-speed pulse signal from the vehicle speed sensor 116, the CPU 115 determines whether or not the subject vehicle is in a halt state or moving at a predetermined speed or lower. In the case where the subject vehicle is not in a halt state or not moving at a predetermined speed or lower, Step S1 is followed by Step S2, where the variable-gain transmission amplifier control unit 104 adjusts the gain amount of the variable-gain transmission amplifier 103 to the gain amount for the case where the subject vehicle is moving, so that the transmission electric power is set to the level represented in FIG. 4(*a*). Next, Step S2 is followed by Step S3, where the variable-gain reception amplifier control unit 112 sets the gain of the variable-gain reception amplifier 111 to the gain for the case where the subject vehicle is moving. Furthermore, as described above, in Step S6, the CPU 115 calculates the distance between the subject vehicle and the target object 108, and in Step S7, outputs outwards information ("OUT") on the distance between the subject vehicle and the target object 108.

Figure 4:
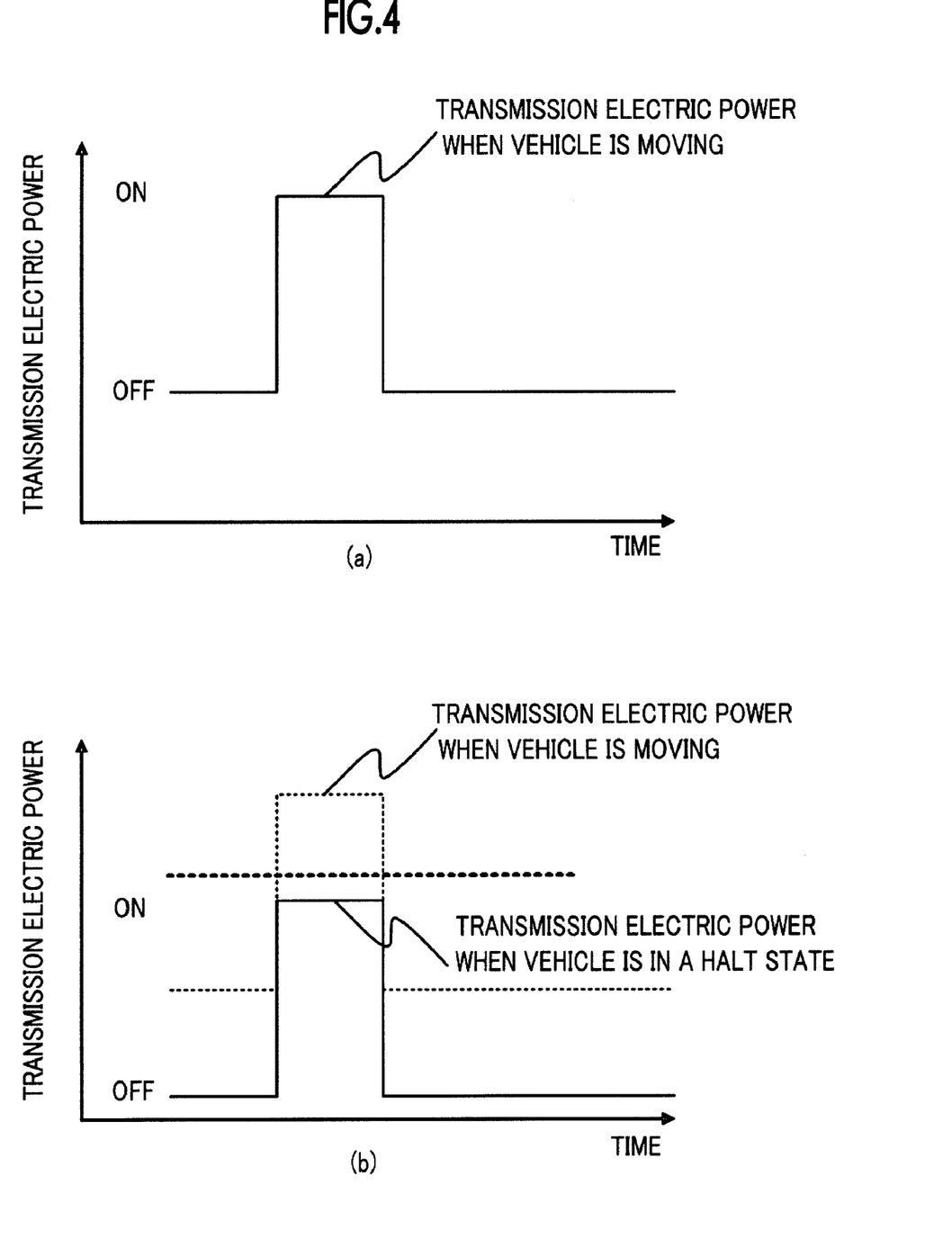
FIG. 4 is a set of graphs for explaining transmission electric power according to Embodiment 1.
Figure 5:
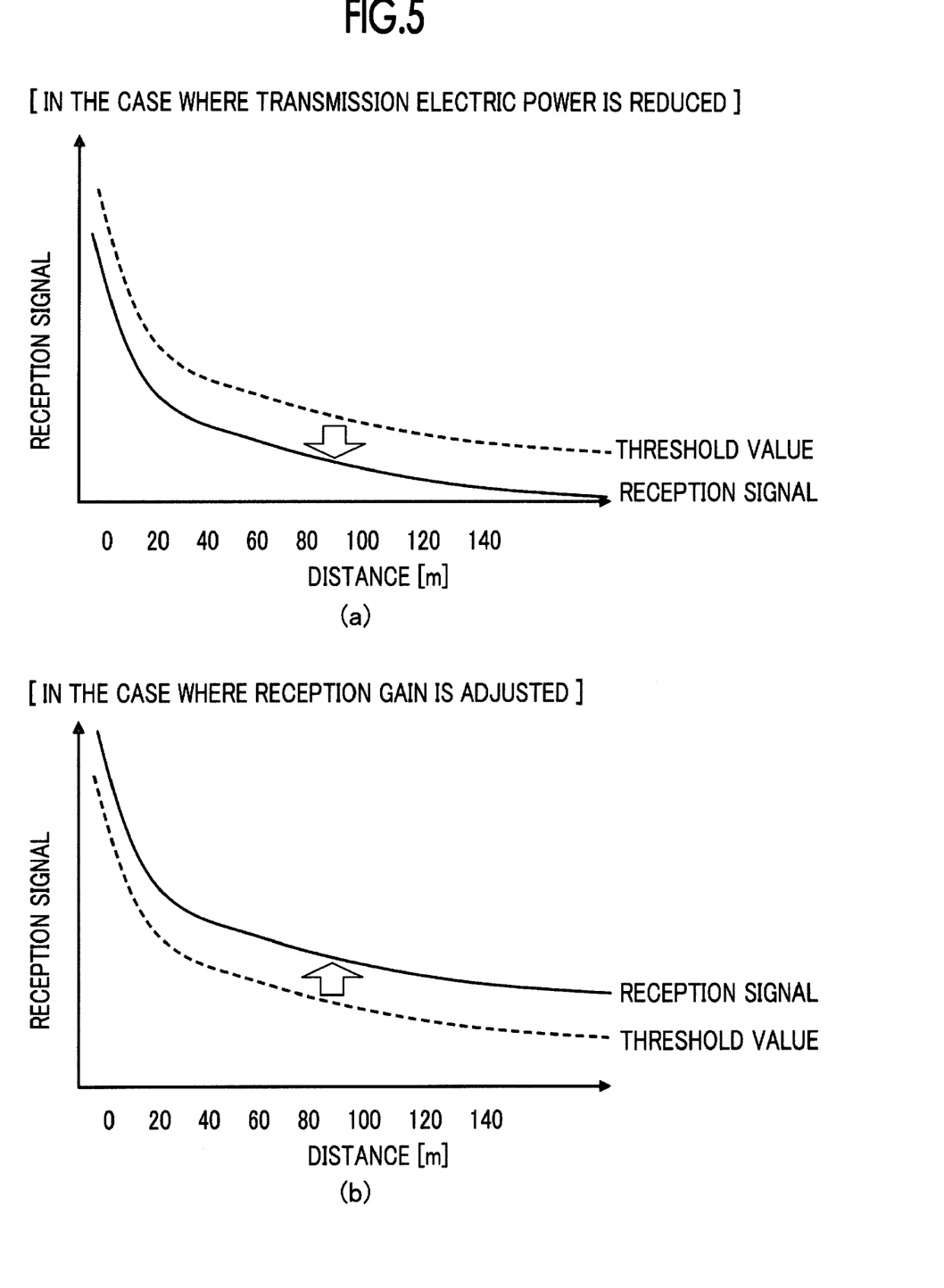
FIG. 5 is a set of graphs for explaining reception gain according to Embodiment 1.

In the case where, in Step S1, the subject vehicle is in a halt state or moving at a predetermined speed or lower, the variable-gain transmission amplifier control unit 104 adjusts, in Step S4, the gain amount of the variable-gain transmission amplifier 103 to the gain amount for the case where the subject vehicle is in a halt state so that, as represented in FIG. 4(*b*), the transmission electric power is set to be the same as or smaller than a predetermined electric power "X"; thus, the electric power transmitted from the transmission antenna 107 is reduced. Due to the reduction of the transmission power, the reception signal becomes, as represented in FIG. 5(*a*), the same as or smaller than a threshold value; therefore, in Step S5, the variable-gain reception amplifier control unit 112 makes the reception signal the same as or larger than the threshold value, as represented in FIG. 5(*b*).

Figure 6:
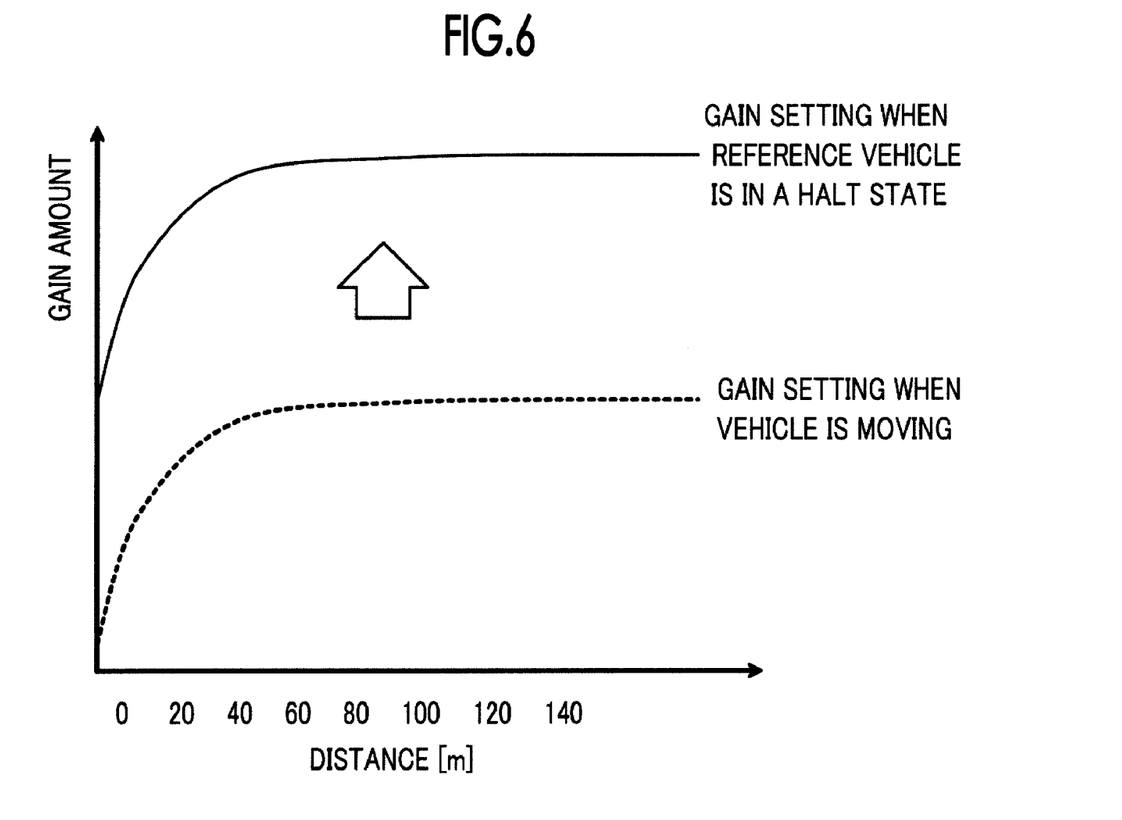
FIG. 6 is a graph representing a reception signal according to Embodiment 1.

FIG. 6 is a graph representing the conditions of gain amounts, of the variable-gain reception amplifier 111, for the case where the subject vehicle is moving and the case where the subject vehicle is in a halt state; the gain amount of the variable-gain reception amplifier 111 in the case where the subject vehicle is in a halt state is made larger than the gain amount for the case where the subject vehicle is moving. After that, in Step S6, the CPU 115 calculates information such as the distance between the subject vehicle and the target object 108, and in Step S7, outputs outwards information ("OUT") on the distance between the subject vehicle and the target object 108. In such a manner as described above, the transmission output in the case where the subject vehicle is in a halt state or moving at a predetermined speed or lower is reduced to be the same as or smaller than a predetermined value and in order to compensate the reduction, the reception sensitivity is raised to amplify the reception signal; as a result, even though the transmission electric power is reduced, the target object is not missed and information on the target object can stably be detected even in the case where the subject vehicle is in a halt state or moving at a predetermined speed or lower.

Embodiment 2

Embodiment 2 will be explained below. In addition, the configuration of Embodiment 2 is the same as that illustrated in FIG. 1; therefore, the explanation therefor will be omitted. Next, the operation of an in-vehicle radar system 1 in Embodiment 2 will be explained with reference to the flowchart in FIG. 7. The explanation will be started with a description for the situation in which the vehicle speed sensor 116 in FIG. 1 outputs to the CPU 115 a vehicle-speed pulse signal corresponding to the speed of the subject vehicle. In Step S101 in FIG. 7, the CPU 115 determines, based on the vehicle-speed pulse signal from the vehicle speed sensor 116, whether or not the subject vehicle is in a halt state.

In the case where the subject vehicle is not in a halt state or not moving at a predetermined speed or lower, Step S101 is followed by Step S102, where the variable-gain transmission amplifier control unit 104 adjusts the gain amount of the variable-gain transmission amplifier 103 to the gain amount for the case where the subject vehicle is moving, so that the transmission electric power is set to the level represented in FIG. 4(*a*). Next, Step S102 is followed by Step S103, where the variable-gain reception amplifier control unit 112 sets the gain of the variable-gain reception amplifier 111 to the gain for the case where the subject vehicle is moving. Furthermore, as described above, in Step S104, the CPU 115 calculates the distance between the subject vehicle and the target object 108, and in Step S112, outputs outwards information ("OUT") on the distance between the subject vehicle and the target object 108.

In the case where, in Step S101, the subject vehicle is in a halt state or moving at a predetermined speed or lower, the variable-gain transmission amplifier control unit 104 adjusts, in Step S105, the gain amount of the variable-gain transmission amplifier 103 to the gain amount for the case where the subject vehicle is in a halt state so that, as represented in FIG. 4(*b*), the transmission electric power is set to be the same as or smaller than a predetermined electric power "X"; thus, the electric power transmitted from the transmission antenna 107 is reduced. Due to the reduction of the transmission power, the reception signal becomes, as represented in FIG. 5(*a*), the same as or smaller than a threshold value; therefore, in Step S106, the variable-gain reception amplifier control unit 112 makes the reception signal the same as or larger than the threshold value, as represented in FIG. 5(*b*).

Figure 7:
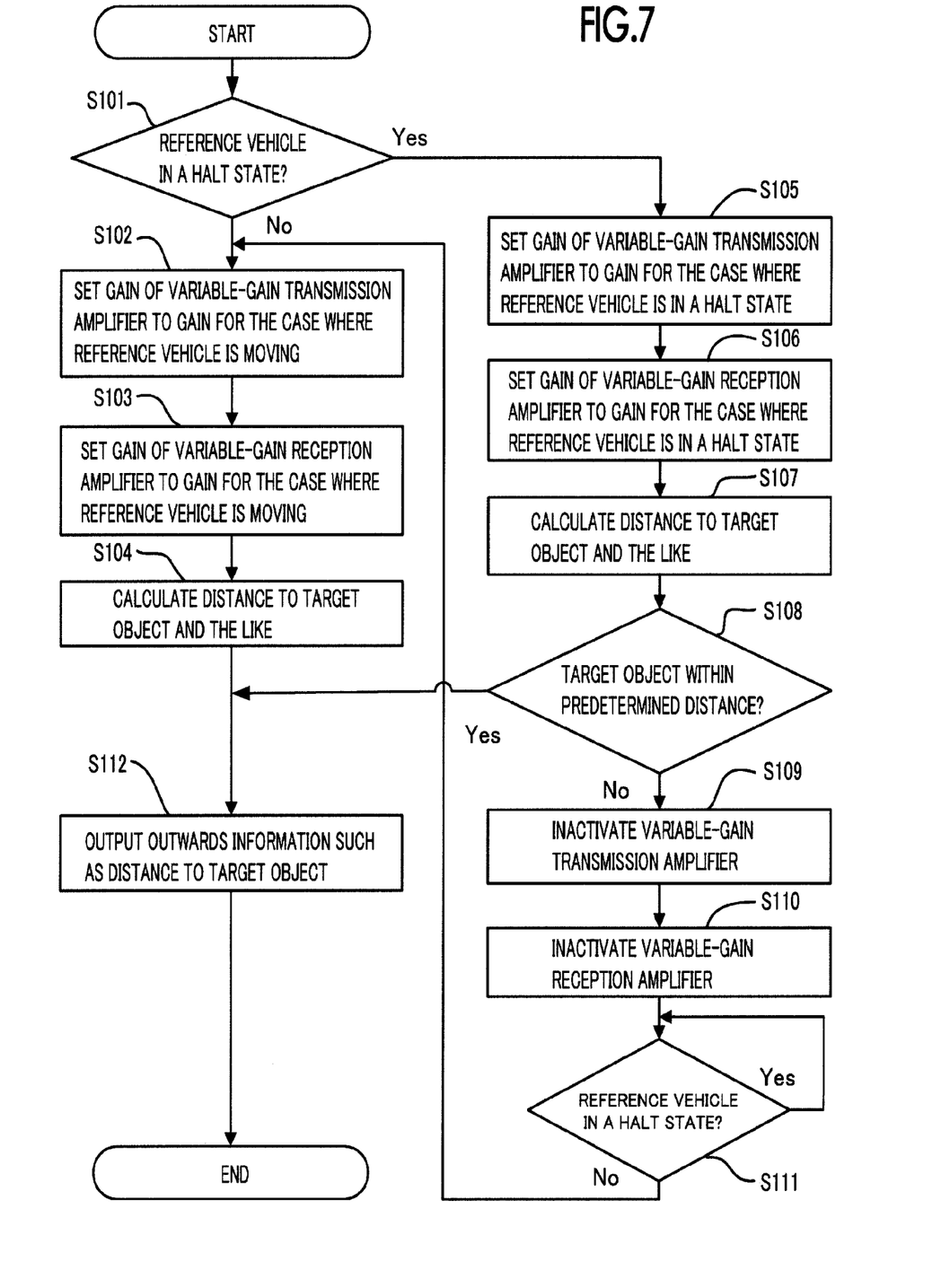
FIG. 7 is a flowchart illustrating operation according to Embodiment 2.

After that, in Step S107, the CPU 115 calculates information on the distance between the subject vehicle and the target object 108, and in Step S108, determines whether or not the target object 108 is within a predetermined distance from the subject vehicle. In the case where the target object 108 exists with in the predetermined distance, the CPU 115 outputs outwards, in Step S112, information ("OUT") such as the distance between the subject vehicle and the target object 108. In the case where the target object 108 is not within the predetermined distance, Step S108 is followed by Step S109, where the variable-gain transmission amplifier control unit 104 inactivates the variable-gain transmission amplifier 103. After that, in Step S110, the variable-gain reception amplifier control unit 112 inactivates the variable-gain reception amplifier 111.

Next, in Step S111, based on the vehicle-speed pulse signal, corresponding to the speed of the subject vehicle, outputted from the vehicle speed sensor 116, the CPU 115 determines whether or not the subject vehicle is in a halt state or moving at a predetermined speed or lower. In the case where the subject vehicle is in a halt state or moving at the predetermined speed or lower, the CPU 115 repeats, in Step S111, the determination of whether the subject vehicle is in a halt state or not. When the subject vehicle resumes its movement, Step S111 is followed by Step S102. The flow from Step S102 to End is the same as that in the case where, in Step 101, the subject vehicle is not in a halt state; therefore, the explanation therefor will be omitted.

In such a manner as described above, in the case where the subject vehicle is in a halt state or moving at a predetermined speed or lower and the target object is not within a predetermined distance, the variable-gain transmission amplifier and the variable-gain reception amplifier are inactivated, so that power dissipation can be reduced. In addition, instead of inactivating the variable-gain transmission amplifier and the variable-gain reception amplifier, electric-wave transmission output from the transmission unit and electric-wave reception input inputted through the reception unit may be stopped.

Embodiment 3

Embodiment 3 will be explained below. In addition, the configuration of Embodiment 3 is the same as that illustrated in FIG. 1; therefore, the explanation therefor will be omitted.

Figure 8:
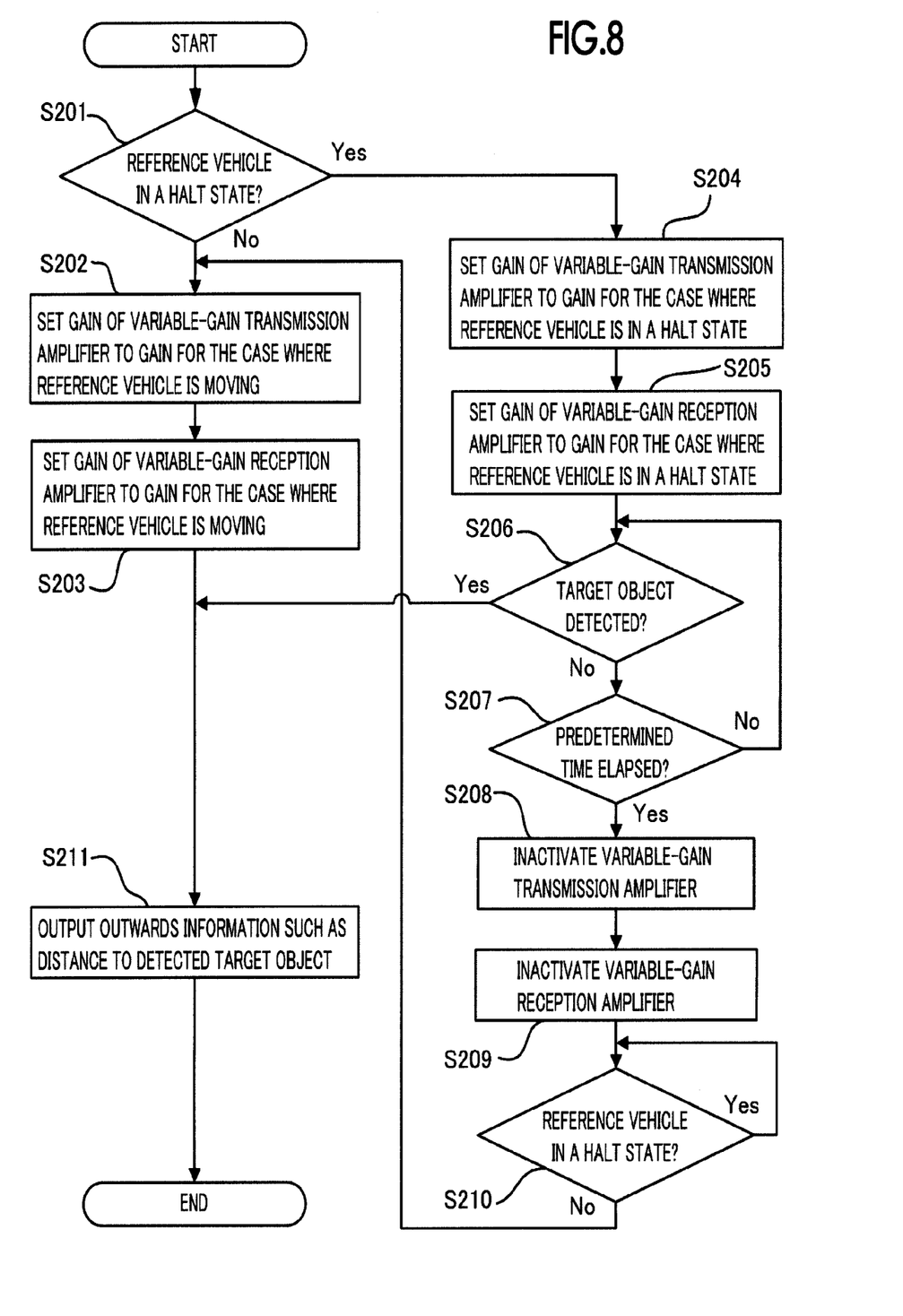
FIG. 8 is a flowchart illustrating operation according to Embodiment 3.

Next, the operation of an in-vehicle radar system 1 in Embodiment 3 will be explained with reference to the flowchart in FIG. 8. In Step S201 in FIG. 8, the CPU 115 determines, based on the vehicle-speed pulse signal from the vehicle speed sensor 116, whether or not the subject vehicle is in a halt state.

In the case where the subject vehicle is not in a halt state or not moving at a predetermined speed or lower, Step S201 is followed by Step S202, where the variable-gain transmission amplifier control unit 104 adjusts the gain amount of the variable-gain transmission amplifier 103 to the gain amount for the case where the subject vehicle is moving. Next, Step S202 is followed by Step S203, where the variable-gain reception amplifier control unit 112 sets the gain of the variable-gain reception amplifier 111 to the gain for the case where the subject vehicle is moving. In the case where the target object 108 is detected, the CPU 115 outputs outwards, in Step S211, information ("OUT") on the distance between the subject vehicle and the detected target object 108.

In the case where the subject vehicle is in a halt state or moving at a predetermined speed or lower, the variable-gain transmission amplifier control unit 104 adjusts, in Step S204, the gain amount of the variable-gain transmission amplifier 103 to the gain amount for the case where the subject vehicle is in a halt state, so that the electric power transmitted from the transmission antenna 107 is reduced. Due to the reduction of the transmission power, the reception signal becomes, as represented in FIG. 5(*a*), the same as or smaller than a threshold value; therefore, in Step S205, the gain amount of the variable-gain reception amplifier 111 is enlarged by the variable-gain reception amplifier control unit 112 so as to be the gain amount, as represented in FIG. 6, for the case where the subject vehicle is in a halt state.

Next, Step S205 is followed by Step S206, where, based on the reception signal, the CPU 115 determines whether or not the target object 108 has been detected. In the case where the target object 108 has been detected, Step S206 is followed by Step S211, where the CPU 115 outputs outwards information ("OUT") on the distance between the subject vehicle and the detected target object 108. In the case where the target object 108 has not been detected, Step S206 is followed by Step S207. In Step S207, the CPU 115 starts measurement of time and repeats Step S206 until a predetermined time elapses so as to detect the target object 108. In the case where the target object 108 is detected until the predetermined time elapses, Step S206 is followed by Step S211, where the CPU 115 outputs outwards information ("OUT") on the distance between the subject vehicle and the detected target object 108.

In the case where the target object 108 is not detected until predetermined time elapses, the CPU 115 stops the measurement of time and proceeds to Step S208. In Step S208, the variable-gain transmission amplifier control unit 104 inactivates the variable-gain transmission amplifier 103; after that, in Step S209, the variable-gain reception amplifier control unit 112 inactivates the variable-gain reception amplifier 111.

Next, in Step S210, based on the vehicle-speed pulse signal, corresponding to the speed of the subject vehicle, outputted from the vehicle speed sensor 116, the CPU 115 determines whether or not the subject vehicle is in a halt state or moving at a predetermined speed or lower. In the case where the subject vehicle is in a halt state or moving at the predetermined speed or lower, the CPU 115 repeats Step S210. When the subject vehicle resumes its movement, Step S210 is followed by Step S202. The flow from Step S202 to End is the same as that in the case where, in Step 201, the subject vehicle is not in a halt state; therefore, the explanation therefor will be omitted.

In such a manner as described above, in the case where the subject vehicle is in a halt state or moving at a predetermined speed or lower and the target object is not detected within a predetermined time, the variable-gain transmission amplifier and the variable-gain reception amplifier are inactivated, so that power dissipation can be reduced. In addition, it goes without saying that, instead of inactivating the variable-gain transmission amplifier and the variable-gain reception amplifier, electric-wave transmission output from the transmission unit and electric-wave reception input inputted through the reception unit may be stopped.

Various modifications and alterations of this invention will be apparent to those skilled in the art without departing from the scope and spirit of this invention, and it should be understood that this is not limited to the illustrative embodiments set forth herein.

What is claimed is:

1. An in-vehicle radar system for transmitting an electric wave toward a target object and measuring the distance between a subject vehicle and the target object, based on the electric wave that has been reflected by the target object, the in-vehicle radar system comprising:

subject vehicle-speed determination means for determining whether or not the subject vehicle is in a halt state or moving at a predetermined speed or lower;

transmission-output control means for setting a transmission output smaller than that for the case where the subject vehicle is moving, when the subject vehicle-speed determination means determines that the subject vehicle is in a halt state or moving at the predetermined speed or lower; and reception-sensitivity control means for setting a reception gain amount larger than that for the case where the subject vehicle is moving, in the case where the transmission output is set smaller than that for the case where the subject vehicle is moving.

2. The in-vehicle radar system according to claim 1, wherein the transmission-output control means is configured with a transmission gain amplifier for amplifying a transmission output from an oscillator and a transmission gain amplifier control unit for controlling or halting the transmission output, and the reception-sensitivity control means is configured with a reception gain amplifier for amplifying an inputted reception signal and a reception gain amplifier control unit for controlling or halting a gain amount of the reception signal.

3. The in-vehicle radar system according to claim 1, further comprising means for determining whether or not a target object is within a predetermined distance from the subject vehicle, wherein, in the case where the means determines that the target object is not within the predetermined distance, operation of the radar system is halted.

4. The in-vehicle radar system according to claim 1, further comprising means for determining whether or not a target object has been detected within a predetermined time, wherein, in the case where the means does not detect the target object within the predetermined time, operation of the radar system is halted.

5. The in-vehicle radar system according to claim 2, further comprising a CPU for setting a gain amount of the transmission gain amplifier or the reception gain amplifier to a gain amount for the case where the subject vehicle is moving, in the case where the subject vehicle-speed determination means determines that the subject vehicle is moving at the predetermined speed or higher, and for setting the gain amounts of the transmission gain amplifier and the reception gain amplifier to gain amounts for the case where the subject vehicle is in a halt state, in the case where the subject vehicle-speed determination means determines that the subject vehicle is in a halt state or moving at the predetermined speed or lower.

6. The in-vehicle radar system according to claim 5, wherein, in the case where, when the gain amounts of the transmission gain amplifier and the reception gain amplifier are set to the gain amounts for the case where the subject vehicle is in a halt state, the subject vehicle-speed determination means determines that the subject vehicle is moving at the predetermined speed or higher, the gain amount of the transmission gain amplifier or the reception gain amplifier is set to the gain amount for the case where the subject vehicle is moving.

7. An in-vehicle radar system for transmitting an electric wave toward a target object and measuring the distance between a subject vehicle and the target object, based on the electric wave that has been reflected by the target object, the in-vehicle radar system comprising:

a subject vehicle-speed determination unit that determines whether or not the subject vehicle is in a halt state or moving at a predetermined speed or lower;

a transmission-output control unit that sets a transmission output smaller than that for the case where the subject vehicle is moving, when the subject vehicle-speed determination unit determines that the subject vehicle is in a halt state or moving at the predetermined speed or lower; and reception-sensitivity control unit that sets a reception gain amount larger than that for the case where the subject vehicle is moving, in the case where the transmission output is set smaller than that for the case where the subject vehicle is moving.

8. The in-vehicle radar system according to claim 7, wherein the transmission-output control unit is configured with a transmission gain amplifier for amplifying a transmission output from an oscillator and a transmission gain amplifier control unit for controlling or halting the transmission output, and the reception-sensitivity control unit is configured with a reception gain amplifier for amplifying an inputted reception signal and a reception gain amplifier control unit for controlling or halting a gain amount of the reception signal.

9. The in-vehicle radar system according to claim 7, further comprising a processing unit that determines whether or not a target object is within a predetermined distance from the subject vehicle, wherein, in the case where the processing unit determines that the target object is not within the predetermined distance, operation of the radar system is halted.

10. The in-vehicle radar system according to claim 7, further comprising a processing unit that determines whether or not a target object has been detected within a predetermined time, wherein, in the case where the processing unit does not detect the target object within the predetermined time, operation of the radar system is halted.

11. The in-vehicle radar system according to claim 8, further comprising a CPU for setting a gain amount of the transmission gain amplifier or the reception gain amplifier to a gain amount for the case where the subject vehicle is moving, in the case where the subject vehicle-speed determination unit determines that the subject vehicle is moving at the predetermined speed or higher, and for setting the gain amounts of the transmission gain amplifier and the reception gain amplifier to gain amounts for the case where the subject vehicle is in a halt state, in the case where the subject vehicle-speed determination unit determines that the subject vehicle is in a halt state or moving at the predetermined speed or lower.

12. The in-vehicle radar system according to claim 11, wherein, in the case where, when the gain amounts of the transmission gain amplifier and the reception gain amplifier are set to the gain amounts for the case where the subject vehicle is in a halt state, the subject vehicle-speed determination unit determines that the subject vehicle is moving at the predetermined speed or higher, the gain amount of the transmission gain amplifier or the reception gain amplifier is set to the gain amount for the case where the subject vehicle is moving.

13. An in-vehicle radar system for transmitting an electric wave toward a target object and measuring the distance between a subject vehicle and the target object, based on the electric wave that has been reflected by the target object, the in-vehicle radar system comprising:

a subject vehicle-speed determination unit that determines whether or not the subject vehicle is in a halt state or moving at a predetermined speed or lower;

a transmission-output control unit that sets a second output transmission power of the electric wave smaller than a first output transmission power of the electric wave used when the subject vehicle is moving above the predetermined speed, when the subject vehicle-speed determination unit determines that the subject vehicle is in a halt state or moving at the predetermined speed or lower; and a reception-sensitivity control unit which sets a reception gain amount larger when the transmission-output control unit sets a power output of the electric wave to the second output transmission.

14. The in-vehicle radar system according to claim 13, wherein the transmission-output control unit is configured with a transmission gain amplifier for amplifying a transmission output from an oscillator and a transmission gain amplifier control unit for controlling or halting the transmission output, and the reception-sensitivity control unit is configured with a reception gain amplifier for amplifying an inputted reception signal and a reception gain amplifier control unit for controlling or halting a gain amount of the reception signal.

15. The in-vehicle radar system according to claim 13, further comprising a processing unit that determines whether or not a target object is within a predetermined distance from the subject vehicle, wherein, in the case where the processing unit determines that the target object is not within the predetermined distance, operation of the radar system is halted.

16. The in-vehicle radar system according to claim 13, further comprising a processing unit that determines whether or not a target object has been detected within a predetermined time, wherein, in the case where the processing unit does not detect the target object within the predetermined time, operation of the radar system is halted.

17. The in-vehicle radar system according to claim 14, further comprising a CPU for setting a gain amount of the transmission gain amplifier or the reception gain amplifier to a gain amount for the case where the subject vehicle is moving, in the case where the subject vehicle-speed determination unit determines that the subject vehicle is moving at the predetermined speed or higher, and for setting the gain amounts of the transmission gain amplifier and the reception gain amplifier to gain amounts for the case where the subject vehicle is in a halt state, in the case where the subject vehicle-speed determination unit determines that the subject vehicle is in a halt state or moving at the predetermined speed or lower.

18. The in-vehicle radar system according to claim 17, wherein, in the case where, when the gain amounts of the transmission gain amplifier and the reception gain amplifier are set to the gain amounts for the case where the subject vehicle is in a halt state, the subject vehicle-speed determination unit determines that the subject vehicle is moving at the predetermined speed or higher, the gain amount of the transmission gain amplifier or the reception gain amplifier is set to the gain amount for the case where the subject vehicle is moving.

19. The in-vehicle radar system according to claim 1, wherein the electric wave is transmitted at the smaller transmission output.

20. The in-vehicle radar system according to claim 7, wherein the electric wave is transmitted at the smaller transmission output.

* * * * *